United States Patent
Hamann et al.

(10) Patent No.: US 9,885,280 B2
(45) Date of Patent: Feb. 6, 2018

(54) INTERNAL COMBUSTION ENGINE HAVING A LINEAR GENERATOR AND ROTARY GENERATOR

(71) Applicant: SIEMENS AKTIENGESELLSCHAFT, München (DE)

(72) Inventors: Jens Hamann, Fürth (DE); Andreas Klotzek, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 27 days.

(21) Appl. No.: 14/772,917

(22) PCT Filed: Mar. 5, 2013

(86) PCT No.: PCT/EP2013/054398
§ 371 (c)(1),
(2) Date: Sep. 4, 2015

(87) PCT Pub. No.: WO2014/135198
PCT Pub. Date: Sep. 12, 2014

(65) Prior Publication Data
US 2016/0010544 A1  Jan. 14, 2016

(51) Int. Cl.
*F02B 63/04* (2006.01)
*F02B 75/28* (2006.01)
(Continued)

(52) U.S. Cl.
CPC .......... *F02B 63/042* (2013.01); *F02B 63/041* (2013.01); *F02B 75/02* (2013.01);
(Continued)

(58) Field of Classification Search
CPC ...... F02B 63/042; F02B 63/041; F02B 75/02; H02K 7/1815
(Continued)

(56) References Cited

U.S. PATENT DOCUMENTS 6,566,771 B1  5/2003  Stoiber
6,744,155 B1  6/2004  Stoiber
(Continued)

FOREIGN PATENT DOCUMENTS

WO   WO2006/108297   10/2006
WO   WO2009/158701   12/2009

OTHER PUBLICATIONS

Jens Hamann et al., U.S. Pat. No. 7,421,922, Sep. 9, 2008, 2004-0187621, Sep. 30, 2004.
(Continued)

*Primary Examiner* — Kevin A Lathers
(74) *Attorney, Agent, or Firm* — Henry M. Feiereisen, LLC

(57) ABSTRACT

An internal combustion engine includes a piston oscillating in a cylinder linearly between a top dead centre and a bottom dead centre. A crankshaft driven by the piston via a connecting rod is connected to the rotor of a first electrical machine. The rotor co-operates electromagnetically with a stator of the first electrical machine. The stator is connected to a first current converter unit for bidirectional transmission of electrical energy. The rotor of a second electrical machine is disposed on the piston. The stator of the second electrical machine is disposed on the piston. The rotor of the second electrical machine co-operates electromagnetically with the stator of the second electrical machine. The stator of the second electrical machine is connected to a second current converter unit for unidirectional or bidirectional transmission of electrical energy. The current converter units are controlled by a control device common to the current converter units.

10 Claims, 4 Drawing Sheets

(51) Int. Cl.
*H02K 7/18* (2006.01)
*F02B 75/02* (2006.01)

(52) U.S. Cl.
CPC ......... *F02B 75/282* (2013.01); *H02K 7/1815* (2013.01); *H02K 7/1876* (2013.01)

(58) Field of Classification Search
USPC ....................................................... 123/46 E
See application file for complete search history.

(56) References Cited

U.S. PATENT DOCUMENTS

| | | | |
|---|---|---|---|
| 2002/0007818 A1* | 1/2002 | Loise | F02B 61/02 123/406.29 |
| 2003/0011260 A1 | 1/2003 | Hamann | |
| 2004/0200216 A1 | 10/2004 | Klostermann et al. | |
| 2005/0081804 A1* | 4/2005 | Graf | B60K 6/24 123/46 E |
| 2005/0207907 A1* | 9/2005 | Fox | F04B 1/22 417/269 |
| 2006/0238061 A1 | 10/2006 | Hoppe et al. | |
| 2008/0105071 A1 | 5/2008 | Hamann et al. | |
| 2008/0257667 A1 | 10/2008 | Hamann et al. | |
| 2009/0171521 A1* | 7/2009 | Moki | B60L 11/18 701/22 |
| 2009/0199815 A1* | 8/2009 | Fukami | B60K 6/485 123/399 |
| 2009/0278019 A1 | 11/2009 | Hamann et al. | |
| 2009/0302699 A1 | 12/2009 | Denk et al. | |
| 2009/0315505 A1 | 12/2009 | Denk et al. | |
| 2010/0092262 A1 | 4/2010 | Hamann et al. | |
| 2010/0247261 A1 | 9/2010 | Hamann et al. | |
| 2010/0282219 A1* | 11/2010 | Alonso | F01B 3/10 123/51 AA |
| 2012/0112467 A1* | 5/2012 | Gopalakrishnan | H02K 7/1884 290/1 A |

OTHER PUBLICATIONS

Jens Hamann, U.S. Pat. No. 7,219,041, May 15, 2007, 2004-0225484, Nov. 11, 2004.
Thomas Floeck et al., U.S. Pat. No. 7,032,453, Apr. 25, 2006, 2004-0144177, Jul. 29, 2004.
Gerhard Forster et al., U.S. Pat. No. 7,152,503, Dec. 26, 2006, 2005-0103135, May 19, 2005.
Jens Hamann et al., U.S. Pat. No. 6,825,633, Nov. 30, 2004, 2003-0155881, Aug. 21, 2003.
Jens Hamann et al., U.S. Pat. No. 6,784,777, Aug. 31, 2004, 2003-0067375, Apr. 10, 2003.
Jens Hamann et al., U.S. Pat. No. 6,979,932, Dec. 27, 2005, 2004-0150291, Aug. 5, 2004.
Jens Hamann et al., U.S. Pat. No. 7,800,334, Sep. 21, 2010, 2008-0136362, Jun. 12, 2008.
Gerhard Forster et al., U.S. Pat. No. 7,156,224, Jan. 2, 2007, 2004-0262131, Dec. 30, 2004.
Gerhard Forster et al., U.S. Pat. No. 7,891,112, Feb. 22, 2011, 2009-0050782, Feb. 26, 2009.
Ali Haj-Fraj et al., U.S. Pat. No. 7,566,193, Jul. 28, 2009, 2008-0022793, Jan. 31, 2008.
Johannes Birzer et al., U.S. Pat. No. 7,818,087, Oct. 19, 2010, 2009-0088891, Apr. 2, 2009.
Uwe Ladra et al., U.S. Pat. No. 7,950,639, May 31, 2011, 2008-0258033, Oct. 23, 2008.
Uwe Ladra et al., U.S. Pat. No. 7,654,746, Feb. 2, 2010, 2009-0052819, Feb. 26, 2009.
Joachim Denk et al., U.S. Pat. No. 7,928,620, Apr. 19, 2011, 2009-0174270, Jul. 9, 2009.
Dietmar Stoiber et al., U.S. Pat. No. 8,063,598, Nov. 22, 2011, 2009-0261765, Oct. 22, 2009.
Uwe Ladra et al., U.S. Pat. No. 8,040,017, Oct. 18, 2011, 2009-0309454, Dec. 17, 2009.
Joachim Denk et al., U.S. Pat. No. 8,294,314, Oct. 23, 2012, 2010-0181855, Jul. 22, 2010.
Joachim Denk et al., U.S. Pat. No. 7,902,785, Mar. 8, 2011, 2009-0160389, Jun. 25, 2009.
Markus Knorr et al., U.S. Pat. No. 6,690,133, Feb. 10, 2004, 2002-0145398, Oct. 10, 2002.
Elmar Schaefers, U.S. Pat. No. 7,424,337, Sep. 9, 2008, 2005-0093492, May 5, 2005.
Thomas Hoppe et al., U.S. Pat. No. 7,078,842, Jul. 18, 2006, 2005-0062356, Mar. 24, 2005.

* cited by examiner

INTERNAL COMBUSTION ENGINE HAVING A LINEAR GENERATOR AND ROTARY GENERATOR

CROSS-REFERENCES TO RELATED APPLICATIONS

This application is the U.S. National Stage of International Application No. PCT/EP2013/054398, filed Mar. 5, 2013, which designated the United States and has been published as International Publication No. WO 2014/135198.

BACKGROUND OF THE INVENTION present invention relates to an internal combustion engine,
   wherein the internal combustion engine has a first cylinder,
   wherein a first piston of the internal combustion engine is guided linearly in the first cylinder, so that the first piston oscillates in the first cylinder between a first top dead center and a first bottom dead center,
   wherein the internal combustion engine has a first crankshaft driven by the first piston via a first connecting rod, where the first crankshaft is connected in a torsion-proof manner with the rotor of a first electrical machine,
   wherein the rotor of the first electrical machine co-operates electromagnetically with a stator of the first electrical machine,
   wherein the stator of the first electrical machine is connected for bidirectional transmission of electrical energy to a first converter unit.

Such internal combustion engines are generally known. In particular any normal emergency power unit is embodied in this way.

With a normal internal combustion engine the linear movement of the piston is converted by means of a crankshaft into a rotational movement. The rotational movement is then either used directly as mechanical energy or is used in some other way, to generate electrical energy for example.

Usually the electrical machine is not used in the prior art in order to explicitly influence the sequence of the cycle of the internal combustion engine. However the influence on the cycle is already known.

The transmission of mechanical force from the piston via the connecting rod to the crankshaft varies considerably as a function of the rotational position of the crankshaft. In particular in its vicinity of the top dead center and of the bottom dead center of the piston movement the conversion of the linear force acting on the piston into the torque effecting the rotational movement of the crankshaft occurs with a poor transmission ratio. An optimization of the cycle of the internal combustion engine is therefore only possible to a limited extent.

SUMMARY OF THE INVENTION

The object of the present invention is to further develop an electrical machine of the type stated at the start such that an optimization of the cycle of the internal combustion engine is simplified and improved.

The object is achieved in accordance with the invention by an internal combustion engine
   having a first cylinder,
   wherein a first piston of the internal combustion engine is guided linearly in the first cylinder, so that the first piston oscillates in the first cylinder between a first top dead center and a first bottom dead center,
   wherein the internal combustion engine has a first crankshaft driven via a first connecting rod by the first piston, which is connected to the rotor of a first electrical machine in a torsion-proof manner,
   wherein the rotor of the first electrical machine co-operates electromagnetically with a stator of the first electrical machine,
   wherein the stator of the first electrical machine is connected, for bidirectional transmission of electrical energy to a first converter unit,
   wherein the rotor of a second electrical machine is disposed on the first piston,
   wherein the stator of the second electrical machine is disposed on the first cylinder,
   wherein the rotor of the second electrical machine co-operates electromagnetically with the stator of the second electrical machine,
   wherein the stator of the second electrical machine is connected, for unidirectional or bidirectional transmission of electrical energy, to a second converter unit and
   wherein the first and the second converter unit are controlled by a control device common to the converter units.

Advantageous embodiments of the internal combustion engine are the subject matter of the dependent claims.

The result achieved by this embodiment is that, regardless of the rotational position of the crankshaft, at any point in time at least one electrical machine can exert influence with a good level of efficiency on the linear movement of the piston and conversely the linear movement of the piston acts at any point in time with a good level of efficiency on at least one electrical machine.

To control the converter units the control device is generally provided with a rotational position of the first crankshaft and/or a position of the first piston. Preferably the control device controls the first converter unit such that the first electrical machine, depending on the rotational position of the first crankshaft and/or the position of the first piston, acts as generator or as motor. The control device preferably controls the second converter unit such that the second electrical machine acts at any point in time as generator. This embodiment simplifies the structure of the second converter unit.

In a preferred embodiment of the present invention the control device controls the first and the second converter unit such that during the power stroke of the first piston the first electrical machine also acts as generator and that, within the power stroke in the vicinity of the first top dead center, a second power output by the second electrical machine is greater than a first power output by the first electrical machine and in a central area between the first top dead center and the first bottom dead center the second power output by the second electrical machine is less than the first power output by the first electrical machine. This is especially preferred in the event of the second power output by the second electrical machine within the power stroke also being greater in the vicinity of the first bottom dead center than the first power output by the first electrical machine.

In the simplest case the first and the second electrical machine are operated by the control device with speed regulation. As an alternative the first and the second electrical machine can be operated by the control device with position regulation.

It is possible for the internal combustion engine only to have a single cylinder. In the case of a position control it is however also possible as an alternative that, the internal combustion engine has a second cylinder,
a second piston of the internal combustion engine is guided linearly in the second cylinder, so that the second piston oscillates in the second cylinder between a second top dead center and a second bottom dead center,
a first end face surface of the first piston and a second end face surface of the second piston each delimit a combustion chamber of the internal combustion engine on one side,
the internal combustion engine has a second crankshaft driven via a second connecting rod by the second piston, which is connected in a torsion-proof manner with a rotor of a third electrical machine,
the rotor of the third electrical machine co-operates electromagnetically with a stator of the third electrical machine,
the stator of the third electrical machine is connected, for bidirectional transmission of electrical energy, to a third converter unit,
the rotor of a fourth electrical machine is disposed on the second piston,
the stator of the fourth electrical machine is disposed on the second cylinder,
the rotor of the fourth electrical machine co-operates electromagnetically with the stator of the fourth electrical machine and
the stator of the fourth electrical machine is connected, for unidirectional or bidirectional transmission of electrical energy, to a fourth converter unit.

Preferably the third converter unit and the fourth converter unit are also controlled by the control device. The control can especially be such that the movement of the second piston is not completely uniform in relation to that of the first piston.

Preferably the control device is provided with the rotational position of the first crankshaft, but not with the position of the first piston. For correct control of the first and the second converter unit the control device therefore establishes, on the basis of the rotational position of the first crankshaft and a speed of the first electrical machine, the position and a linear speed of the first piston. Provided the second cylinder and the second piston are present, the corresponding information applies in the same way for the rotational position of the second crankshaft and the position of the second piston.

The electrical machines and the converter units can be dimensioned as required. It is possible for the electrical machines to be pure auxiliary units such as the alternator of a vehicle motor. Preferably however the electrical machines and the converter units are dimensioned such that exclusively electrical energy but no mechanical energy is output by the internal combustion engine in operation of the internal combustion engine.

As alternatives the internal combustion engine can operate according to the two-stroke principle or according to the four-stroke principle.

BRIEF DESCRIPTION OF THE DRAWING

The aforementioned characteristics, features and advantages of this invention as well as the manner in which these are achieved will become clearer and easier to understand in conjunction with description given below of the exemplary embodiments, which are explained in greater detail in connection with the drawings, in which, in schematic diagrams.

DETAILED DESCRIPTION OF PREFERRED EMBODIMENTS

Figure 1:
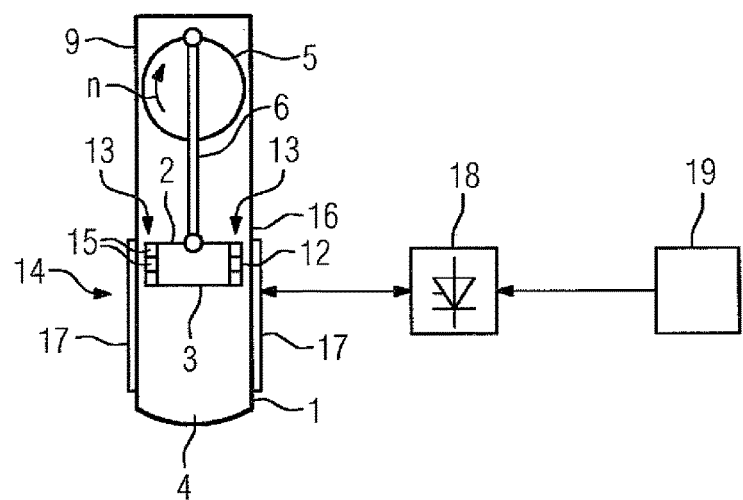
FIG. 1 shows an internal combustion engine in longitudinal section.
Figure 2:
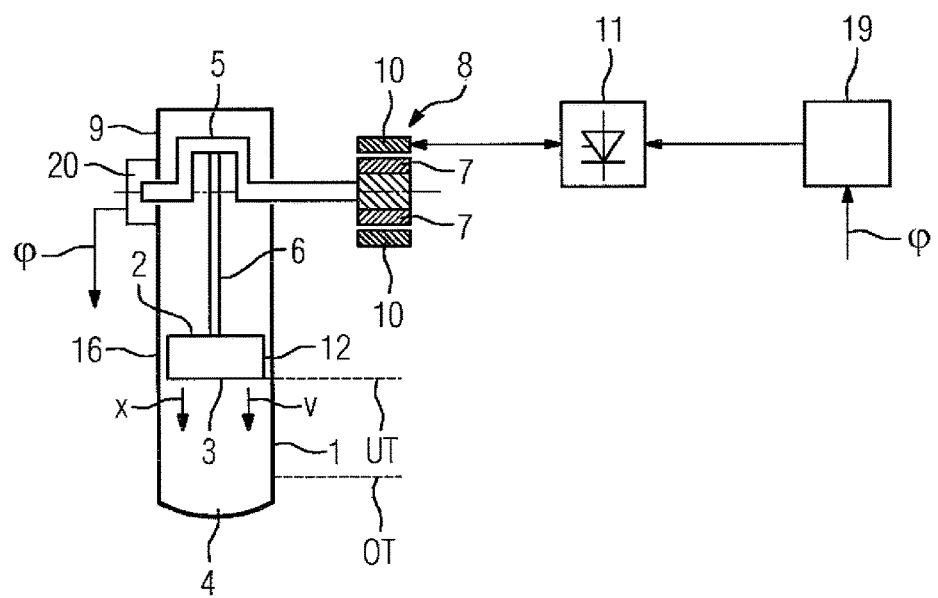
FIG. 2 shows the internal combustion engine from FIG. 1 in cross section.

According to FIGS. 1 and 2 an internal combustion engine has a first cylinder 1. A first piston 2 of the internal combustion engine is guided linearly the first cylinder 1. The first piston 2 oscillates in the first cylinder 1 between a first top dead center OT and a first bottom dead center UT. A first end face surface 3 of the first piston 2 delimits a combustion chamber 4 of the internal combustion engine to one side. The internal combustion engine can alternatively operate in accordance with the two-stroke principle or in accordance with the four-stroke principle.

The internal combustion engine further has a first crankshaft 5. The first crankshaft 5 is driven by a first piston 2 via a first connecting rod 6. It is connected (see FIG. 2) in a torsion-proof manner with the rotor 7 of a first electrical machine 8. It is possible in accordance with the diagram in FIG. 2 for the first electrical machine 8 to be disposed outside a crankshaft housing 9 of the internal combustion engine. As an alternative the first electrical machine 8 can be disposed within the crankshaft housing 9 and thus be integrated into the internal combustion engine.

The rotor 7 of the first electrical machine 8 co-operates electromagnetically with a stator 10 of the first electrical machine 8. The stator 10 of the first electrical machine 8 is connected for bidirectional transmission of electrical energy to a first converter unit 11. Electrical energy can be transmitted bidirectionally between the stator 10 of the first electrical machine 8 and the first converter unit 11. The first electrical machine 8 can thus—depending on the control of the first converter unit 11—be operated alternately as generator or as motor.

Disposed on the first piston 2—for example on a jacket surface 12 of the first piston 2—is the rotor 13 of a second electrical machine 14. The rotor 13 can for example include permanent magnets 15 in accordance with the diagram in FIG. 1. In this case the second electrical machine 14 is embodied as a permanent field synchronous machine. As an alternative the rotor 13 could have a winding and the second electrical machine 14 could be embodied thereby as an electrically excited synchronous machine. Again as an alternative the second electrical machine 14 could be embodied for example as an asynchronous machine. Other embodiments are also possible.

Disposed on the first cylinder 1—for example on a jacket surface 16 of the first cylinder 1—is the stator 17 of the second electrical machine 14. The stator 17 co-operates electromagnetically with the rotor 13 of the second electrical machine 14. At least in that area in which the stator 17 is disposed the first cylinder 1 preferably consists of a non-magnetizable or only weakly-magnetizable material, for example of aluminum, a highly-alloyed steel or a sufficiently temperature-resistant plastic.

The stator 17 of the second electrical machine 14 is connected according to FIG. 1 to a second converter unit 18. Under some circumstances electrical energy can be transferred bidirectionally between the stator 17 of the second electrical machine 14 and the second converter unit 18. In this case the second electrical machine 14—depending on control of the second converter unit 18—can alternatively be operated as generator or as motor. Alternatively it is possible for electrical energy only to be able to be transferred unidirectionally between the stator 17 of the second electrical machine 14 and the second converter unit 18. In this case the second electrical machine 14 is always operated as generator.

The first and the second converter unit 11, 18 are controlled by a control device 19 common to one of the converter units 11, 18. Through appropriate control of the converter units 11, 18 by the control device 19, especially during the power stroke of the first piston 2, the movement of the first piston 2 can be explicitly delayed and accelerated, in order thereby to optimize fuel consumption, emissions and/or power yields and/or another operating parameter of the internal combustion engine.

The control device 19 is supplied with a rotational position φ of the first crankshaft 5 and/or a position x of the first piston 2. Preferably the control device 19 is especially supplied with the rotational position φ of the first crankshaft 5. For example the first electrical machine 8 can be assigned a rotary encoder 20, by means of which the rotational position φ of the first electrical machine 8 and thus also of the first crankshaft 5 is detected. The rotary encoder 20 can transfer the detected rotational position φ to the control device 19.

It is possible for the control device 19 additionally to also be supplied explicitly with the position x of the first piston 2. Preferably however the position x of the first piston 2 is not supplied to the control device 19. This is because the control device 19, on the basis of the rotational position φ of the first crankshaft 5, can especially establish directly and immediately the position x and the direction of a linear velocity v of the first piston 2. The amount of the linear velocity v is given by the rotational position φ of the first crankshaft 5 and rotational speed n of the first electrical machine 8.

Figure 3:
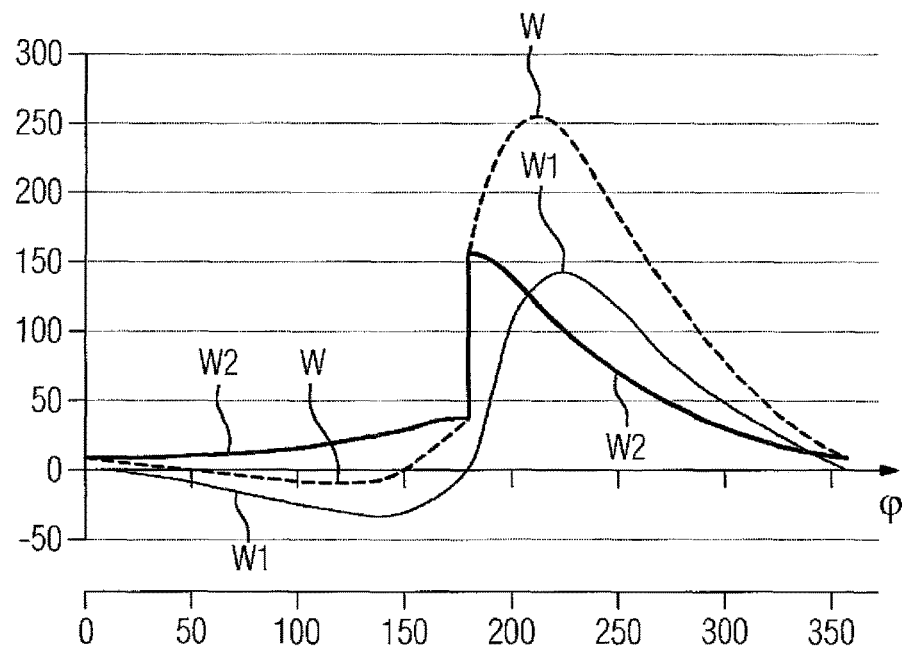
FIG. 3 shows a timing diagram.

FIG. 3 shows, by way of example in arbitrary units, timing curves of a first effect W1 applied by the first electrical machine 8 and a second effect applied W2 by the second electrical machine 14 as well as an overall effect W applied in total by the two electrical machines 8, 11 as a function of the rotational position φ (in degrees) of the first crankshaft 5. The effects W1, W2, W can correspond to powers or currents for example. At any point in time the following relationship applies:

$$W = W1 + W2$$

FIG. 3 shows—purely by way of example—the timing curves for an embodiment of the internal combustion engine as a two-stroke engine. The information provided below however is in principle readily also applicable to an embodiment of the internal combustion engine as a four-stroke engine.

It can be seen on the one hand from FIG. 3 that the control device 19 controls the second converter unit 18 such that the second electrical machine 14 acts as a generator at any point in time. Both the absolute value of the second effect W2 and also the relative share of the overall effect W fluctuate however. It can further be seen from FIG. 3 that the control device 19 controls the first converter unit 11 such that the first electrical machine 8 acts as generator or as motor, depending on the rotational position φ of the first crankshaft 5 and/or the position x of the first piston 2. In particular the first electrical machine 8 acts as generator during the power stroke of the first piston 2, otherwise preferably as motor. Both during the power stroke and also under other circumstances however both the absolute value of the first effect W1 and also its relative share of the overall effect W fluctuate. Finally it can be seen from FIG. 3 that within the power stroke of the first piston 2 in its vicinity of the first top dead center OT the second power W2 is greater than the first power W1. In a central area between the first top dead center OT and the first bottom dead center UT of the power stroke on the other hand the situation is reversed. If the first piston 2, as part of the power stroke, moves towards the first bottom dead center UT, preferably once again the second power W2 becomes greater than the first power W1. Crossing points at which the first and the second power W1, W2 are equal in size, preferably lie at appr. 30° to appr. 60° behind the first top dead center OT or at appr. 30° to appr. 60° in front of the first bottom dead center UT.

Figure 4:
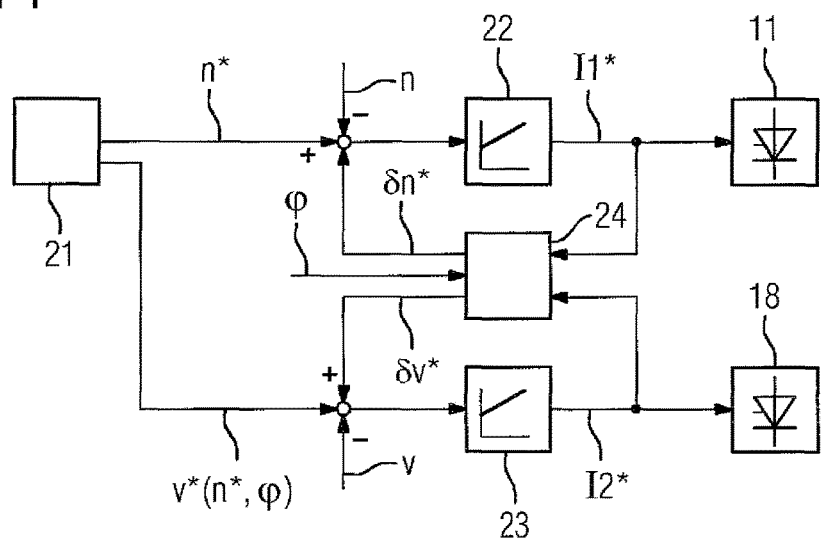
FIG. 4 shows a block diagram.

It is possible for the first and the second electrical machine 8, 14 to be operated by the control device 19 with speed regulation. FIG. 4 shows a corresponding regulation structure realized within the control device 19.

In accordance with FIG. 4 a setpoint value generator 21 outputs a rotational speed setpoint value n* to a rotational speed regulator 22. The rotational speed regulator 22 is also supplied with the rotational speed n of the first crankshaft 5. The rotational speed regulator 22 establishes a first setpoint current value I1* and controls the first converter unit 11 accordingly. The setpoint value generator 21 further establishes, on the basis of the rotational speed setpoint value n* and the rotational position φ of the first crankshaft 5, a velocity setpoint value v*. The velocity setpoint value v* and the measured or computationally-established linear velocity v of the first piston 2 are supplied to a speed regulator 23. The speed regulator 23 establishes a second current setpoint value I2* and controls the second converter unit 18 accordingly. In a comparator 24 a (rotational position-dependent) evaluation of the two current setpoint values I1*, I2* is undertaken. Depending on the result of the comparison the speed regulator 22 and/or the velocity regulator 23 is supplied with a correction value δn*, δv*.

As an alternative to the speed or velocity regulation explained above, the first and the second electrical machine 8, 14 can be operated by the control device 19 under position control.

Figure 5:
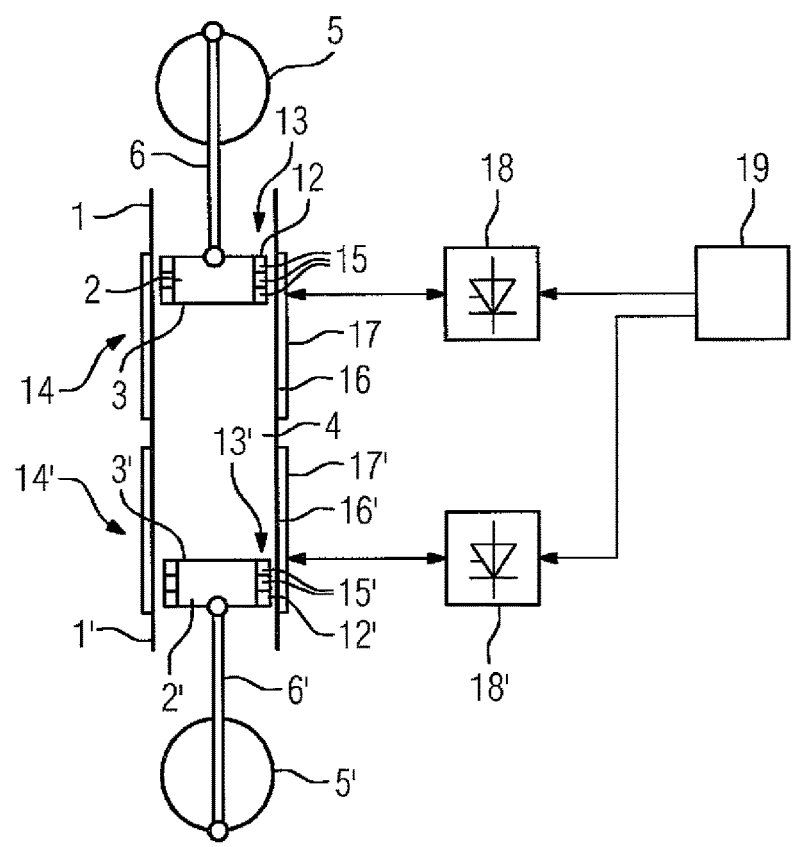
FIG. 5 shows a further internal combustion engine in longitudinal section and
FIG. 6 shows the internal combustion engine from FIG. 5 in cross section.
Figure 6:
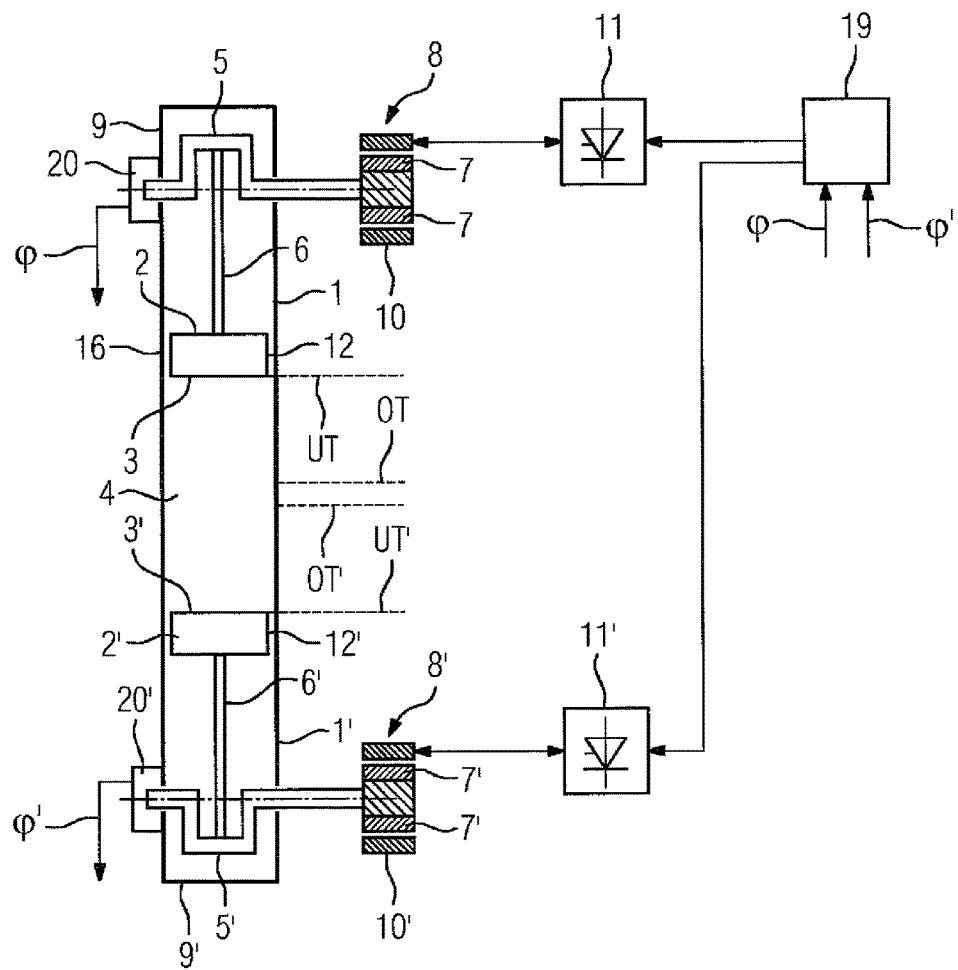

In the case of position-controlled operation the internal combustion engine, in accordance with FIGS. 5 and 6—in addition to the first cylinder 1 and to the first piston 2—can have a second cylinder 1' and a second piston 2'. In this case the second piston 2' is guided linearly in the second cylinder 1', so that the second piston 2' oscillates in the second cylinder 1' between a second top dead center OT' and a second bottom dead center UT'. A second end face surface 3' of the second piston 2' in this case is preferably delimits the (common) combustion chamber 4 from one side.

The further embodiment is thus as already explained above for the first cylinder 1 and the first piston 2. The corresponding elements 5' to 18' and 20' of the internal combustion engine are thus provided with reference characters which are provided with an apostrophe compared to the reference characters explained above in connection with FIGS. 1 and 2.

The control device 19 also controls the converter units 11', 18', referred to below, to distinguish them from the converter units 11, 18 explained above in connection with FIG. 1, as the third converter unit 11' and as the fourth converter unit 18'.

It is possible for the control device 19 to control the third and the fourth converter unit 11', 18' in a similar manner to the first and second converter unit 11, 18. As an alternative it is possible however for the first converter unit 11 and the second converter unit 18 on the one hand and the third converter unit 11' and the fourth converter unit 18' on the other hand to be controlled by the control device 19 such that the movement of the second piston 2' is not completely uniform in relation to that of the first piston 2. The movement of the two pistons 2, 2', must be similar however. In particular the movements must have the same basic frequency. They can however have a—possibly time-variable—phase offset in relation to one another. Thus for example, despite a constant stroke of the two pistons 2, 2', a variable cylinder capacity can be effected. Also—as an alternative or in addition to a variation of the cylinder capacity—harmonics of the movements of the two pistons 2, 2' can be different from one another.

The electrical machines 8, 14 or 8, 14, 8', 14' and the converter units 11, 18 or 11, 18, 11', 18' can be dimensioned as required. In particular they can be dimensioned such that, in operation of the internal combustion engine, exclusively electrical energy but no mechanical energy is output by the internal combustion engine.

Because of the presence both of the rotational electrical machine 8 and also the linear machine 14, at each rotational position, at least one electrical machine 8, 14 is well coupled to the movement of the first piston 2. The overall system can be regulated in a significantly simpler manner through this.

Although the invention has been illustrated and described in greater detail by the preferred exemplary embodiment, the invention is not restricted by the disclosed examples and other variations can be derived here from by the person skilled in the art without departing from the scope of protection of the invention.

What is claimed is:

1. An internal combustion engine, comprising:
    a first converter unit;
    a first electrical machine having a stator connected, for bidirectional transmission of electrical energy, to the first converter unit, and a rotor cooperating electromagnetically with the stator, said first electrical machine being positioned outside and not being integrated in the combustion engine, such that the rotor and the stator of the first electrical machine are arranged separately from the combustion engine;
    a first cylinder;
    a first piston guided linearly in the first cylinder for oscillation in the first cylinder between a first top dead center and a first bottom dead center, said first piston being connected to a first crankshaft driven by the first piston via a first connecting rod, said first crankshaft being connected to the rotor of the first electrical machine in a torsion-proof manner;
    a second converter unit;
    a second electrical machine having an armature disposed on the first piston, and a stator disposed on the first cylinder and connected, for unidirectional or bidirectional transmission of electrical energy, to the second converter unit, said rotor of the second electrical machine cooperating electromagnetically with the stator of the second electrical machine; and
    a control device configured to control the first and second converter units, wherein the control device is supplied with a rotational position of the first crankshaft and/or a position of the first piston, said control device being configured to control the first converter unit such that the first electrical machine, depending on the position of the first piston and/or the rotational position of the first crankshaft, acts alternately as a generator or as a motor, and to control the second converter unit, such that the second electrical machine acts at any point in time as generator.

2. The internal combustion engine of claim 1, wherein -the control device is configured to control the first and second converter units such that, during a power stroke of the first piston, the first electrical machine acts as generator, wherein within the power stroke in a vicinity of the first top dead center, a second power output by the second electrical machine is greater than a first power output by the first electrical machine, and in a central area between the first top dead center and the first bottom dead center, a second power output by the second electrical machine is less than the first power output by the first electrical machine.

3. The internal combustion engine of claim 2, wherein the second power output by the second electrical machine is greater within the power stroke in the vicinity of the first bottom dead center than the first power output by the first electrical machine.

4. The internal combustion engine of claim 1, wherein the first and second electrical machines are operated by the control device under speed regulation.

5. The internal combustion engine of claim 1, wherein the first and second electrical machines are operated by the control device under position regulation.

6. The internal combustion engine of claim 1, further comprising:
    a second cylinder;
    a second piston guided linearly in the second cylinder for oscillation in the second cylinder between a second top dead center and a second bottom dead center, said first and second pistons having each an end face surface to delimit a combustion chamber of the internal combustion engine on one side;
    a third converter unit;
    a third electrical machine having a stator connected, for bidirectional transmission of electrical energy, to the third converter unit, and a rotor cooperating electromagnetically with the stator;
    a second crankshaft driven by the second piston via a second connecting rod, which is connected in a torsion-proof manner to the rotor of the third electrical machine;
    a fourth electrical machine having a rotor disposed on the second piston, and a stator disposed on the second cylinder, said rotor of the fourth electrical machine cooperating electromagnetically with the stator of the fourth electrical machine; and
    a fourth converter unit, said stator of the fourth electrical machine being connected, for unidirectional or bidirectional transmission of electrical energy, to the fourth converter unit.

7. The internal combustion engine of claim 6, wherein the first, second, third and fourth electrical machines and the first, second, third and fourth converter units are dimensioned such that, during operation of the internal combustion engine, exclusively electrical energy but no mechanical energy is output by the internal combustion engine.

8. The internal combustion engine of claim 6, wherein the third and fourth converter units are controlled by the control device, said control unit being configured to control the first, second, third and fourth converter units such that a movement of the second piston is not completely uniform in relation to a movement of the first piston.

9. The internal combustion engine of claim 1, wherein the control device is supplied with a rotational position of the first crankshaft, but not with a position of the first piston, said control device being configured to establish, based on the rotational position of the first crankshaft and a rotational speed of the first electrical machine, a position and a linear velocity of the first piston.

10. The internal combustion engine of claim 1, wherein the internal combustion engine operates in accordance with the two-stroke principle or in accordance with the four-stroke principle.

\* \* \* \* \*